June 28, 1932.  L. J. PROPPER  1,864,668
MACHINE FOR MAKING STICK CANDY
Filed May 22, 1929  4 Sheets-Sheet 1

Witness:
William P. Kilroy

Inventor:
Louis J. Propper
By Hill & Hill
Attys

June 28, 1932.  L. J. PROPPER  1,864,668
MACHINE FOR MAKING STICK CANDY
Filed May 22, 1929  4 Sheets-Sheet 2

Witness:
William P. Kilroy

Inventor
Louis J. Propper
By Hill & Hill
Attys

June 28, 1932.  L. J. PROPPER  1,864,668
MACHINE FOR MAKING STICK CANDY
Filed May 22, 1929  4 Sheets-Sheet 3

Witness:
William P. Kilroy

Inventor:
Louis J. Propper
By Hill & Hill
Attys.

June 28, 1932.  L. J. PROPPER  1,864,668
MACHINE FOR MAKING STICK CANDY
Filed May 22, 1929  4 Sheets-Sheet 4
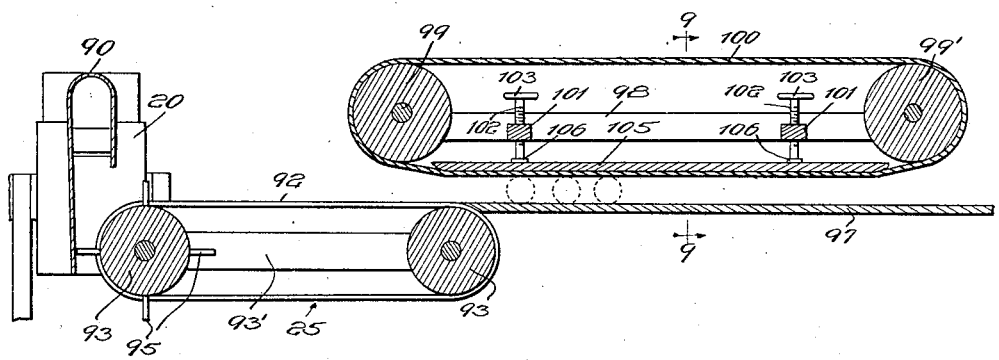
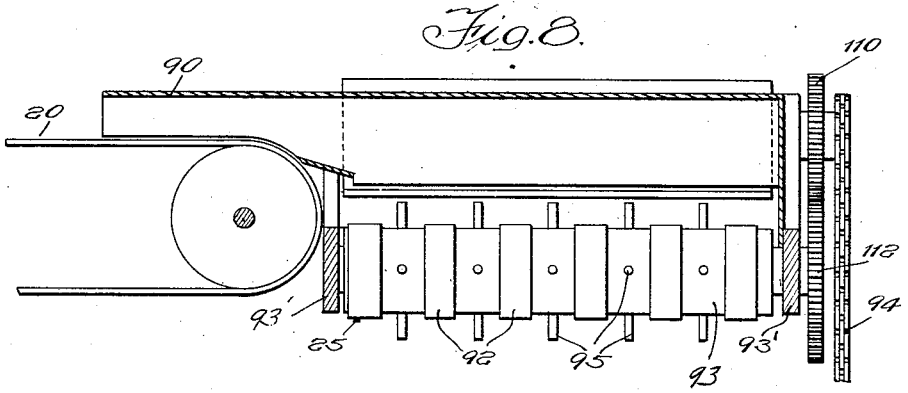
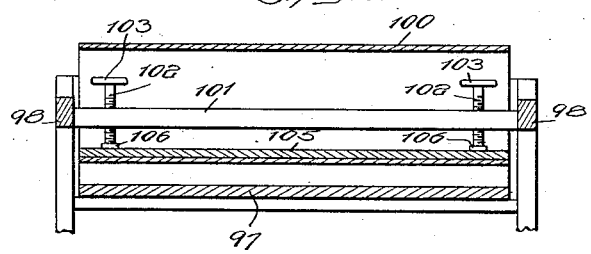
Witness:
William P. Kilroy
Inventor:
Louis J. Propper Patented June 28, 1932

1,864,668

UNITED STATES PATENT OFFICE

LOUIS J. PROPPER, OF CHICAGO, ILLINOIS

MACHINE FOR MAKING STICK CANDY

Application filed May 22, 1929. Serial No. 365,032.

My invention relates to candy making machinery and has to do more particularly with apparatus for producing candy of the type known in the trade as stick candy. As is well known, such candy usually is provided with a twisted or spiral stripe or a plurality of such stripes. Apparatus embodying my invention is designed for taking the candy after it has been properly prepared and formed into a cylindrical piece having a longitudinal stripe or a plurality of such stripes on the surface thereof, twisting such candy and, at the same time, cutting it into sticks of a desired length, and cooling and finishing the cut sticks.

In candy making machines heretofore produced, provided with cutting or severing devices, the severing devices interfere with the steady and even flow of the uncut strip of candy at the instant the cutters make contact with the candy strip, thus causing the uncut strip to back up and clog the other parts of the machine or, if the severing devices do not interfere with the steady even forward movement of the uncut strip, they interfere with the steady twisting movement thereof and to some extent cause the untwisting of the strip at the instant the cutters make contact therewith. My improved device will feed and twist the strip and, at the same time, cut or sever the same during its travel and its twisting without interrupting either movement.

One object of my invention is to provide a device which will, in a single operation, twist a strip of candy so as to form a helical stripe or stripes thereon or maintain such a twist and at the same time cut such candy into sticks.

Another object is the production of a candy machine which may be so adjusted and set up as to permit a variation in the different strips, both as to pitch of the stripe or stripes and in the length of the severed sections.

Another object is to provide means for finishing candy sticks.

A further object is to provide apparatus of the type referred to which will be convenient, simple and durable in construction, and certain and dependable in operation.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 3 is a top plan view through a combined twister and cutter embodying my invention;

Fig. 4 is a sectional view taken substantially on the line 4—4 of Fig. 3;

Fig. 5 is a sectional view taken substantially on the line 5—5 of Fig. 4;

Fig. 6 is a sectional view taken substantially on the line 6—6 of Fig. 4;

Fig. 7 is a sectional view taken substantially on the line 7—7 of Fig. 1;

Fig. 8 is a sectional view taken substantially on the line 8—8 of Fig. 1; and

Fig. 9 is a sectional view taken substantially on the line 9—9 of Fig. 7.

Figure 1:
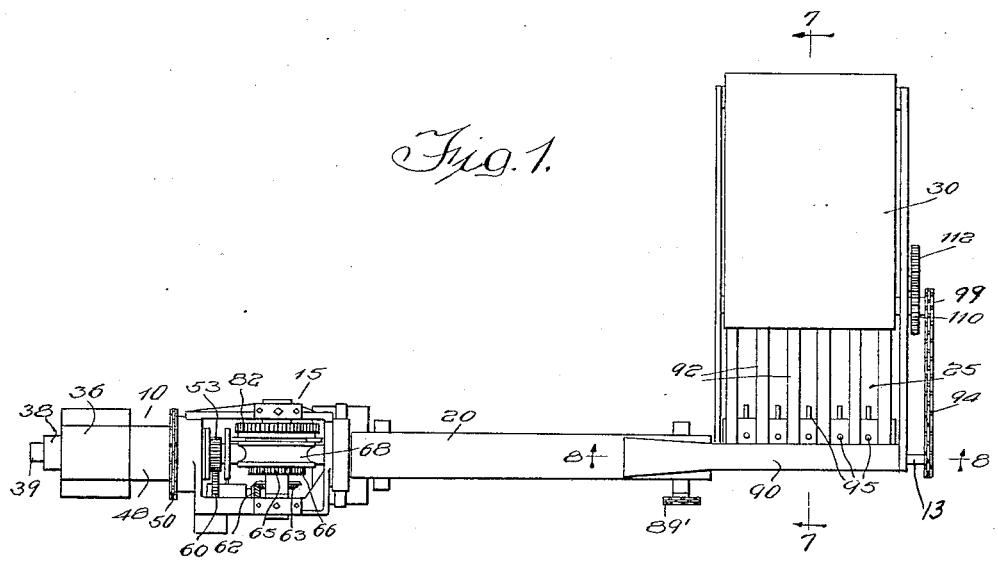
Fig. 1 is a top plan view of apparatus, shown more or less diagrammatically, embodying my invention.
Figure 2:
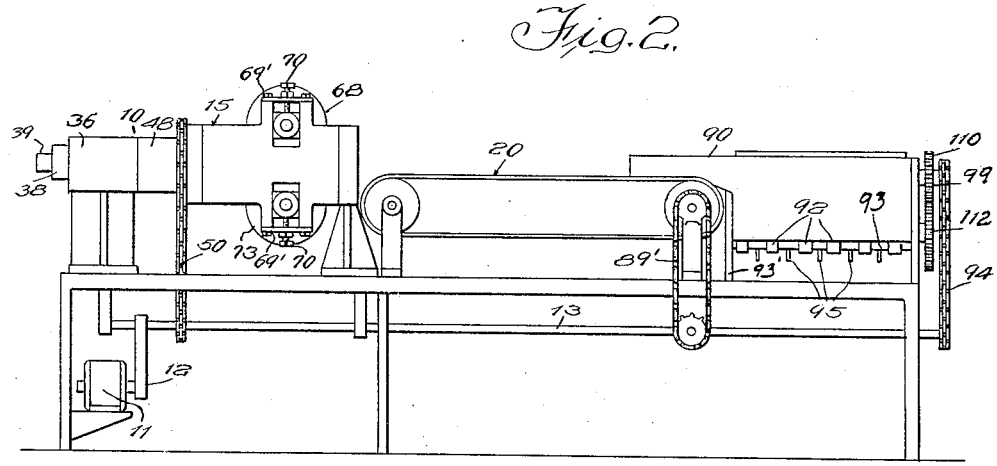
Fig. 2 is a side elevation of the same.

Referring first to Fig. 1, there is provided a conduit 10 for conveying a cylindrical piece or strip of candy of any desired length to a combined twisting and cutting device 15. From the twisting and cutting device 15 the candy is fed to a high speed conveyor 20 which carries the cut sticks to a relatively low speed conveyor 25, these conveyors permitting the sticks to cool. The conveyor 25 carries the sticks, arranged transversely of its direction of travel, to a finishing device indicated at 30, from which the sticks may be received by suitable packing devices or other desired apparatus.

Referring now to Figs. 2 to 6, inclusive, the cylindrical piece of candy, which it will be understood, comes from suitable mixing and forming apparatus, is fed to the twisting and cutting apparatus indicated generally at 15. This apparatus comprises a standard 35 which is adapted to rest upon a floor 26 or other suitable support and has formed at the upper portion thereof, a split bearing member 36 adapted to seat a tubular sleeve 38. Secured within the member 38 is a tubular conduit 39 which is adapted to receive the cylindrical piece of candy and conduct it to the twisting and cutting members to be described. A standard 40 aligned with the standard 35 and substantially similar thereto, having a split bearing portion 41 adjacent the top thereof, cooperates with the standard 35 in supporting the twisting and cutting apparatus.

Mounted upon the standards 35 and 40 is a frame 43 having one face 44 removable as indicated at 45. Journaled on the sleeve 38 is a rotatable bushing 47 to which is secured a tubular extension 48 having secured thereto a sprocket 49. Cooperating with the sprocket 49 is a sprocket chain 50 which serves to impart motion to the member 48 and the parts carried thereby and may be driven by any suitable means, such as an electric motor 11 or the like acting through a belt 12 and line shaft 13. The frame 43 is rotatably secured on the sleeve 38 by means of a collar 52 which is secured to the sleeve by any suitable means, such as screw threads or the like. This collar abuts against the inner end of the tubular extension 48. Formed adjacent the inner extremity of the sleeve 38 is a plurality of gear teeth 53. It will be understood that the sleeve 38 is stationary and arranged therein is a rotatable tube 54 which abuts against the stationary conduit 39, to form a substantially continuous passageway or guide for the strip of candy as it passes therethrough. The rotatable tube 54 is secured to the revolving frame 43 preferably by means of a collar 55 which is attached to the tube and a pin 56 engaging the collar and also engaging the side of a bearing 57 which is suitably secured to the frame 43. It is thus seen that the frame 43 is rotatably supported by the standards 35 and 40. The sleeve 38 and the gear 53 formed thereon are stationary, the purpose of these elements being set forth below.

Journaled in the bearing 57 is a stub-shaft 58, to one end of which is secured a gear 60 meshing with the gear 53. At the other end of the stub-shaft 58 is a bevel pinion 62 which meshes with a bevel gear 63 rotatably mounted on a shaft 64 which is arranged transversely of the frame 43. The shaft 64 has keyed thereto a gear 65 which meshes with a gear 66 carried by a grooved roller 73 and mounted upon a shouldered shaft 75. The shaft 69 is journaled in suitable bearings 67 slidably arranged in grooves 67' formed in opposite sides of the frame 43, and is adjustable transversely of its axis by means of screws 70 threaded through plates 69' secured to frame 43. Formed in the roller 68 is a groove 71 which may be of any desired radius according to the diameter of the stick of candy which it is desired to form and is preferably semi-circular in shape, although it may be angular or of any desired contour. The groove 71 is positioned directly opposite a similar groove formed in a roller 73 which is similarly mounted on a shouldered shaft 75 substantially similar to the shaft 69 and which is journaled in suitable bearings provided in the sides of the frame 43, in a manner similar to roller 68. By means of the peculiar mounting of the shafts 69 and 75. Rollers and cutters of variable diameters may be adapted to be adjusted within the revolving frame.

The grooved portions of the rollers 68 and 73 form a circular aperture which receives the candy fed to these rollers by means of the conduit 39 and the tube 54. Each of the rollers 68 and 73 on each side of the grooved portion 71 is provided with a substantially flat or smooth peripheral portion 78 which is in alignment with and contacts with similar portions formed on the other roller. In order to keep the grooves in positive alignment at all times, applicant provides a circumferential groove 80 in one of the rollers, say the roller 68, which engages a circumferential tongue 81 provided in the cooperating roller 73. The tongue and groove arrangement prevent any lateral movement of one roller with respect to the other and thus, the semi-circular apertures of the two rollers are maintained in registry with each other so that a circular passage is provided at all times for the candy. The roller 68 is provided with a gear 82 which meshes with a gear 83 secured to the roller 73. Thus, the two rollers are operatively connected, the two rollers being rotated about their axes by means of the rotation of the frame 43. As clearly seen in Figs. 4 and 6, the shafts 69 and 75 are parallel. Upon removal of the plate 44, the rollers 68 and 73 may be removed from their shafts 69 and 75, respectively, and if desired, rollers of different radii for handling stick candy of different diameters and lengths may be substituted therefor.

The rollers 68 and 73 are each formed with a radial slot 85 in which is disposed a cutting member 86. The cutting members are preferably in the form of metallic blades and are so arranged as to take a position directly opposite each other in the same plane once in every revolution of the rollers 68 and 73 and, when the blades are in such a position, the cutting edges thereof substantially meet as best shown in Figs. 5 and 6.

As is well known to persons skilled in the art, stripes are imparted to sticks of candy usually by twisting them, and such a function is provided by rotation of the frame 43 carrying rollers 68 and 73. One revolution of the frame 43 imparts one helical turn to the stripe. During this time, rollers 68 and 73 have advanced the candy a certain distance, the pitch of the helical stripe depending upon this distance. Simultaneously with the advance of the candy, it is cut by means of the blades 86 into sticks of a desired length and it will be obvious that a plurality of slots 85 and blades 86 may be provided in the rollers for cutting more than one stick per revolution of the rollers. In order to adjust the amount the candy is advanced with respect to one revolution of the frame 43, the gear 66 on the roller 73 may be made in different diameters and the diameter of the gear 65 is selected to conform therewith. Inasmuch as the pitch given to the helical strips of candy is or may be made more or less uniform, the gear 66 may be selected to conform to the size of candy which the grooves 71 are capable of making, the gear 66 being rigidly attached to the roller 73. It is merely necessary upon changing rollers to select a gear 66 of the desired diameter.

The sticks of candy twisted by the rollers 68 and 73 and cut by the blades 86 carried by these rollers is fed into a tubular member 88 which is of substantially the same diameter as the members 39 and 54 and is coaxial therewith, the tubular member 88 being carried by a member 89 forming a part of the frame 43 and rotatably journaled in the bearing portion 41 of the standard 40.

From the tubular member 88 the sticks of candy are fed to a relatively high speed conveyor 20. This conveyor may be of any suitable type and is preferably of belt form and may be actuated by any suitable means such as a motor, or the like, acting through a drive belt 89' driven from the line shaft 13. The conveyor 20 carries the candy, arranged longitudinally of the direction of travel of the belt, to a housing member 90 from which the sticks are deposited to a relatively low speed conveyor indicated at 25. The conveyor 25 preferably comprises a plurality of narrow belts 92 trained over a pair of sheaves 93 carried by a suitable support 93'. To the idler sheave 93 are secured a plurality of radial pins 95 which project outwardly from the surface thereof so that as the sticks of candy brought to the conveyor 25 by the high speed conveyor 20 are dropped through the housing 90, they are picked up by the pins 95 and arranged in position transversely of the belts 92 and transversely of their direction of travel.

It will be readily understood that the speeds of the conveyors 20 and 25 are so adjusted that the conveyor 20 will travel through substantially the distance of the length of a stick of candy while the conveyor 25 is travelling through substantially the diameter of the same stick. While the candy is traveling on the conveyors 20 and 25, it is being materially cooled.

The conveyor 25 is actuated by any suitable means such as by a belt 94 driven from the line shaft 13 and to the sheave 99.

From the conveyor 25 the candy is deposited on a finishing device best shown in Figs. 7 and 9 and comprising a table 97 of any suitable type which is arranged in close proximity to the belts 92. Arranged above the table 97 and supported by any suitable means such as a bracket 98, or the like, is a pair of pulleys 99 and 99' around which is trained a belt 100 of any suitable type for imparting a desired finish to the sticks of candy. Arranged on the bracket 98 is a plurality of bosses 101 through which are threaded screws 102 having manipulating members 103 adjacent the upper portions thereof. Carried by the screws 102 adjacent the lower portions thereof is a board 105, this board having a plurality of bosses 106 or other suitable devices for rotatably engaging the screws 102.

It will be readily apparent that by adjustment of the screws 102 by means of their manipulating members 103, the board 105 may be raised or lowered so as to bring the belt 100 into engagement with sticks of candy arranged between the belt and the table 97 so that the belt may convey the sticks of candy along their axes and thus convey them to suitable packing or other apparatus and at the same time impart a desired finish to the sticks. The belt 100 may be actuated by any suitable apparatus, such as a gear 110 carried by the shaft of the pulley 99 which meshes with a gear 112 carried by the shaft of the pulley 93. (See Figs. 1 and 8.)

If desired, suitable cooling apparatus, such as blowers or the like may be mounted adjacent the finishing device.

Having thus described my invention, it is obvious that various immaterial modifications may be made in the same without departing from the spirit of my invention; hence I do not wish to be understood as limiting myself to the exact form, construction, arrangement and combination of parts herein shown and described, and more particularly pointed out in the claims.

What I claim as new and desire to secure by Letters Patent is:

1. In a machine for feeding and twisting a strip of candy and for severing said strip into predetermined lengths, strip severing means mounted for rotation upon axes transverse to the travel of said strip of candy through said machine, a rotatable support upon which said severing means is mounted, and driving means operatively connected with said severing means and with said support for rotating said severing means upon said axes and for simultaneously rotating said support to turn said axes in a plane transverse to the travel of said strip.

2. In a machine for feeding and twisting a strip of candy and for severing said strip into predetermined lengths, strip gripping and severing means mounted for rotation upon axes transverse to the travel of said strip of candy through said machine, a rotatable support upon which said gripping and severing means is mounted, and driving means operatively connected with said gripping and severing means and with said support for rotating said gripping and severing means upon said axes and for simultaneously rotating said support to turn said axes in a plane transverse to the travel of said strip, whereby said candy strip will be simultaneously fed, twisted, and severed into predetermined lengths.

3. In a machine for feeding and twisting a strip of candy and for severing said strip into predetermined lengths, a frame mounted for rotation upon an axis coincident with the center of said strip as it travels through said machine, strip severing means mounted upon said frame for rotation upon axes transverse to the travel of said strip, and driving means operatively connected with said frame for rotating said frame and said severing means each upon their own axes simultaneously.

4. In a machine for feeding and twisting a strip of candy and for severing said strip into predetermined lengths, a frame mounted for rotation upon an axis coincident with the center of said strip as it travels through said machine, strip gripping and severing means mounted upon said frame for rotation upon axes transverse to the travel of said strip, and driving means operatively connected with said frame for rotating said frame and said gripping and severing means each upon their own axes simultaneously.

5. In a machine for feeding and twisting a strip of candy and for severing said strip into predetermined lengths, strip severing means comprising a pair of circumferentially grooved rollers mounted for rotation upon axes transverse to the travel of said strip of candy through said machine, strip severing members fixed upon said rollers transversely across the grooves therein, a rotatable support upon which said rollers are mounted, and driving means operatively connected with said severing means and with said support for rotating said rollers upon said axes and for simultaneously rotating said support to turn said axes in a plane transverse to the travel of said strip.

6. In a machine for feeding and twisting a strip of candy and for severing said strip into predetermined lengths, strip guiding and severing means comprising a pair of circumferentially grooved rollers mounted for rotation upon parallel axes lying in a plane transverse to the travel of said strip of candy through said machine, a strip severing member arranged upon each of said rollers to interrupt the groove therein, a rotatable support upon which said rollers are mounted, and driving means operatively connected with said strip guiding and severing means and with said support for rotating each of said rollers synchronously in opposite directions to effect coincident action of said strip severing members upon each rotation of said rollers, and for simultaneously rotating said support to turn said axes in said plane.

7. In a machine for feeding and twisting a strip of candy and for severing said strip into predetermined lengths, a frame mounted for rotation upon an axis coincident with the center of said strip as it travels through said machine, a plurality of bearings adjustably carried upon said frame, strip severing means removably mounted for rotation in said bearings upon axes transverse to the travel of said strip, and driving means operatively connected with said frame for rotating said frame and said severing means each upon their own axes simultaneously.

8. In a machine for feeding and twisting a strip of candy and for severing said strip into predetermined lengths, a frame mounted for rotation upon an axis coincident with the center of said strip as it travels through said machine, a plurality of bearings adjustably carried upon said frame, strip severing means removably mounted for rotation in said bearings upon axes transverse to the travel of said strip, and driving means operatively connected with said frame for rotating said frame and said severing means each upon their own axes simultaneously; said strip severing means comprising a pair of circumferentially grooved rollers, each having a strip severing member interrupting the groove therein, and said bearings being adjustable in said frame to provide for the accommodation of rollers of different diameters.

9. In a machine for feeding and twisting a strip of candy and for severing said strip into predetermined lengths, a frame mounted for rotation upon an axis coincident with the center of said strip as it travels through said machine, a plurality of bearings adjustably carried upon said frame, a pair of shafts supported in said bearings, the axes of said shafts lying parallel and in a plane transverse to the travel of said strip, cooperating strip severing means and cooperating gearing removably carried upon said shafts, and driving means operatively connected with said frame for rotating said frame and said severing means each upon their own axes simultaneously; said strip severing means comprising a pair of circumferentially grooved rollers, each having a strip severing member interrupting the groove therein; said gearing serving to effect the synchronous rotation of said rollers in opposite directions to insure the coincident action of said strip severing members upon each rotation of said rollers; and said bearings being adjustable in said frame to provide for the accommodation of rollers and gearing of different diameters, whereby the strip of candy may be severed into different predetermined lengths.

10. In a machine for feeding and twisting a strip of candy and for severing said strip into predetermined lengths, a frame mounted for rotation upon an axis coincident with the center of said strip as it travels through said machine, a plurality of bearings adjustably carried upon said frame, a pair of shafts supported in said bearings, the axes of said shafts lying parallel and in a plane transverse to the travel of said strip, cooperating strip severing means and cooperating gearing removably carried upon said shafts, a drive gear carried upon one of said shafts, and driving means operatively connected with said frame for rotating said frame and said severing means each upon their own axes simultaneously; said strip severing means comprising a pair of circumferentially grooved rollers, each having a strip severing member interrupting the groove therein; said cooperating gearing serving to effect the synchronous rotation of said rollers in opposite directions to insure the coincident action of said strip severing members upon each rotation of said rollers; and said bearings being adjustable in said frame to provide for the accommodation of rollers, cooperating gearing, and drive gears of different diameters, whereby the strip of candy may be given twists of different predetermined pitch and may be severed into different predetermined lengths.

In witness whereof, I hereunto subscribe my name this 13th day of May, A. D. 1929.

LOUIS J. PROPPER.